Figure 3:
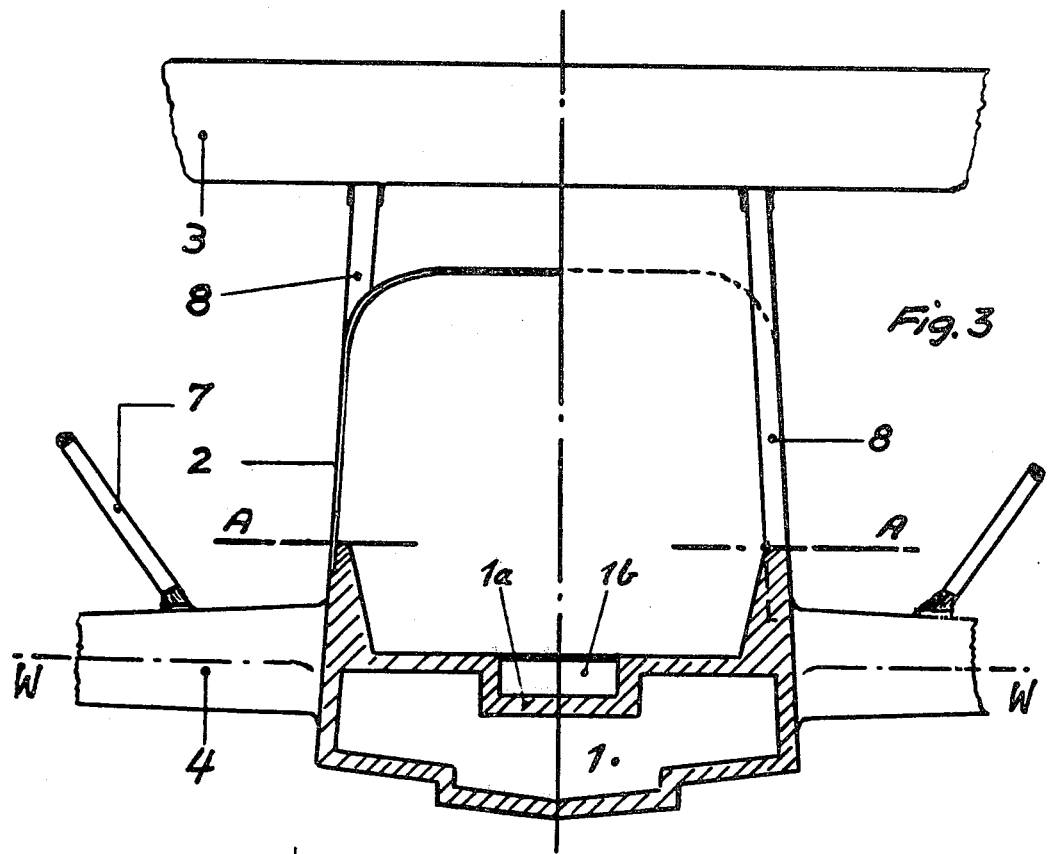

United States Patent [19]

Dornier

[11] 4,270,713
[45] Jun. 2, 1981

[54] AIRPLANE WITH A BOAT-SHAPED FUSELAGE

[76] Inventor: Claudius Dornier, Brunhamstrasse 21, 8000 Munich 60, Fed. Rep. of Germany

[21] Appl. No.: 922,618

[22] Filed: Jul. 7, 1978

Related U.S. Application Data

[63] Continuation of Ser. No. 809,210, Jun. 23, 1977.

[30] Foreign Application Priority Data

Sep. 4, 1976 [DE] Fed. Rep. of Germany ....... 2639982

[51] Int. Cl.³ .............................................. B64C 35/02
[52] U.S. Cl. .................................... 244/106; 244/120
[58] Field of Search ............................... 244/106–108, 244/120, 105, 137 R, 117 R

[56] References Cited

U.S. PATENT DOCUMENTS

| 1,329,336 | 1/1920 | Curtiss | 244/106 |
| 1,778,467 | 10/1930 | Pettersen | 244/106 |
| 2,967,631 | 1/1961 | Storma et al. | 244/106 |
| 3,330,509 | 7/1967 | Barchet | 244/137 R |

FOREIGN PATENT DOCUMENTS

| 699351 | 10/1940 | Fed. Rep. of Germany | 244/120 |
| 132002 | 8/1919 | United Kingdom | 244/106 |
| 565692 | 11/1944 | United Kingdom | 244/106 |
| 612666 | 11/1948 | United Kingdom | 244/106 |
| 750667 | 6/1956 | United Kingdom | 244/120 |

Primary Examiner—Galen L. Barefoot
Attorney, Agent, or Firm—James E. Bryan

[57] ABSTRACT

A flying boat having a boat-like fuselage with a substantially horizontal separation thereof extending in the longitudinal direction into two structural parts which may be separately manufactured, the two parts being a complete lower boat body part and an upper cabin part adapted to be mounted on the boat part, and the lower boat body part and upper cabin part being secured together to form a closed fuselage.

10 Claims, 6 Drawing Figures

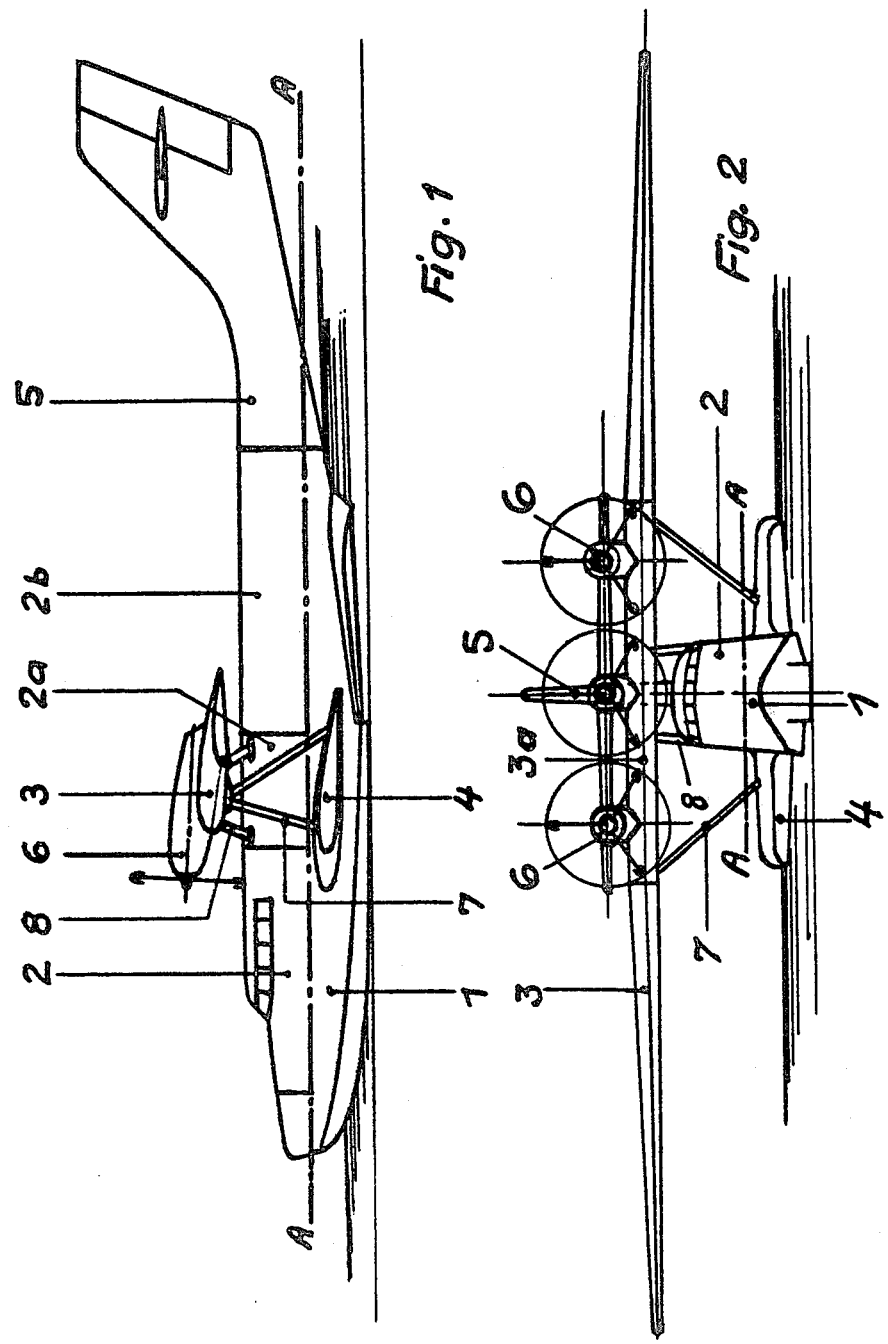

AIRPLANE WITH A BOAT-SHAPED FUSELAGE

This is a continuation of application Ser. No. 809,210 filed June 23, 1977.

The present invention relates to an airplane having a fuselage with a boat-like configuration.

In such airplanes, which are also called "flying boats", heretofore the fuselage frames, or bulkheads, in the lower part thereof, corresponded to the cross-section of the boat shape and, in the upper part thereof, were adapted to the shape of the cabin. In a landplane, the cross-sectional shape of the fuselage remains unchanged over a relatively long extent of the fuselage area, and therefore similar frames or bulkheads are usable. This is not possible in the case of a boat shape of the fuselage, particularly because of the step-up distance. The manufacture of an airplane fuselage having a boat shape is, therefore, expensive and involves difficulties, especially in view of the fact that very special load conditions arise during take-off and landing which must be taken into consideration in the structural concept.

It is the object of the present invention to remedy this situated and to render possible a simpler manufacture of boat-like fuselages.

The solution to this object resides, according to the present invention, in a primarily horizontal separation of the airplane fuselage, this separation extending in the longitudinal direction, into two structural parts which can be manufactured separately, namely a lower complete boat body provided as the carrying part of the aircraft frame, and an upper cabin part adapted to being mounted thereon. It is possible, in this connection, to either mount the cabin part as a unit upon the boat body, or else, if desired, it may be joined together from several indivdual or separate parts.

The boat body may be made watertight in the necessary manner; in other words, the boat body is not only, for example, riveted over its entire length in a watertight fashion, but it is also subdivided by means of bulkheads into several watertight flotation compartments, and protected against collison with foreign objects. The separation into a boat part and a cabin part affords not only a simpler manufacture for each of these structural parts, but additionally also allows to fully equip each structural part individually, and to install, for example, in the boat part a major portion of the control and operating units in the finished condition thereof. The design and provision of the wing assembly as well as of the engines may be made entirely according to the requirements upon which the concept is based.

A particular advantage of the present invention is that the cabin part is constructed as a pressure cabin, as in landplanes, and may be mounted as such upon the boat body. The design of the boat body itself is made according to its intended use; and under certain circumstances the boat body must be constructed not only watertight but also pressure-tight.

In a further development of the inventive concept, there arises the possibility of using a complete fuselage of a landplane as the cabin part and placing thereunder a boat body, and of thus rebuilding a landplane into a flying boat.

Figure 4:
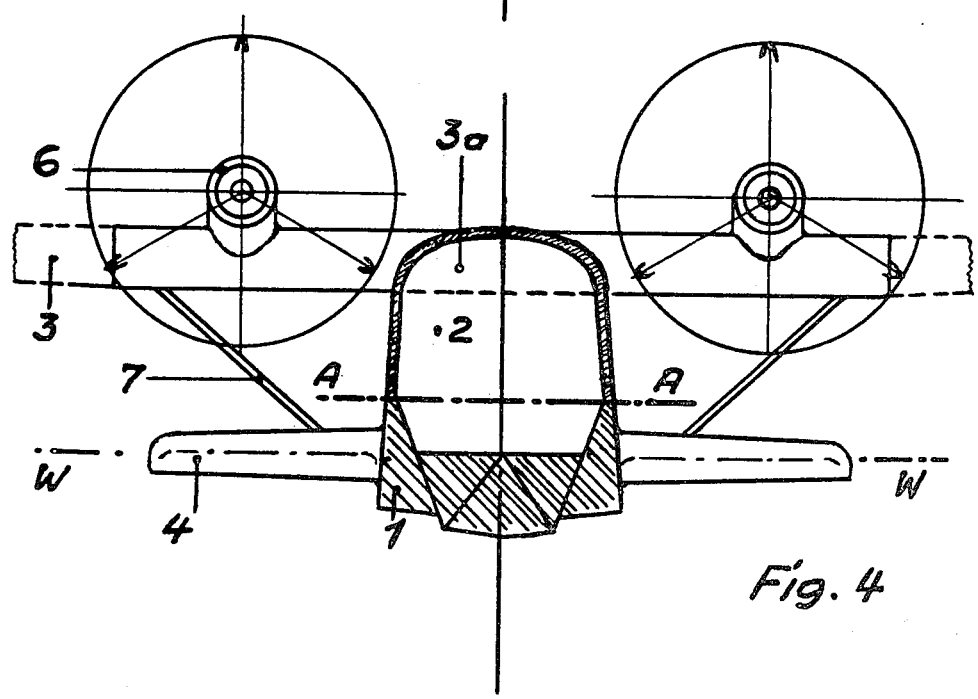
Figure 5:
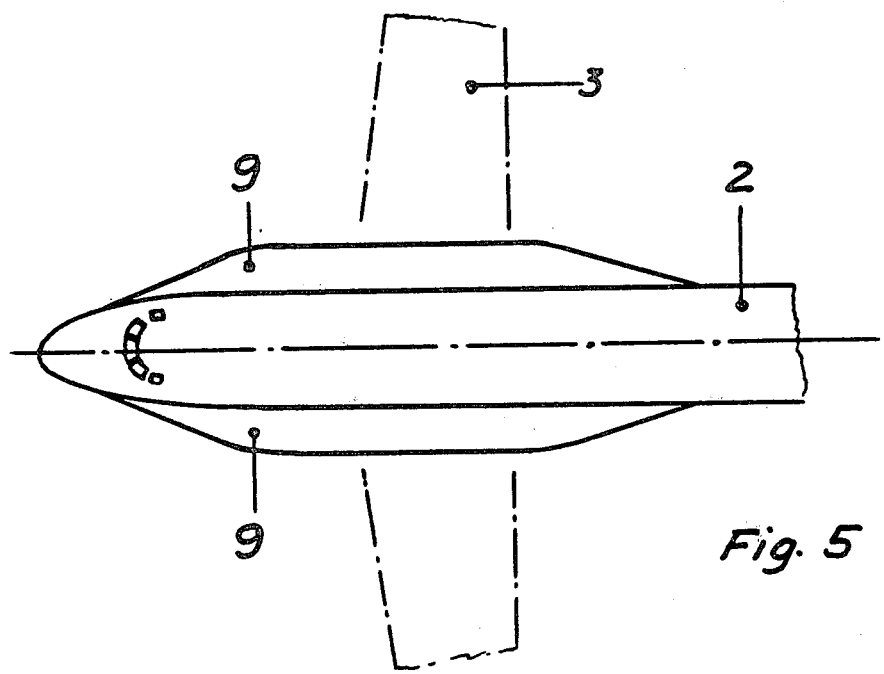
Figure 6:
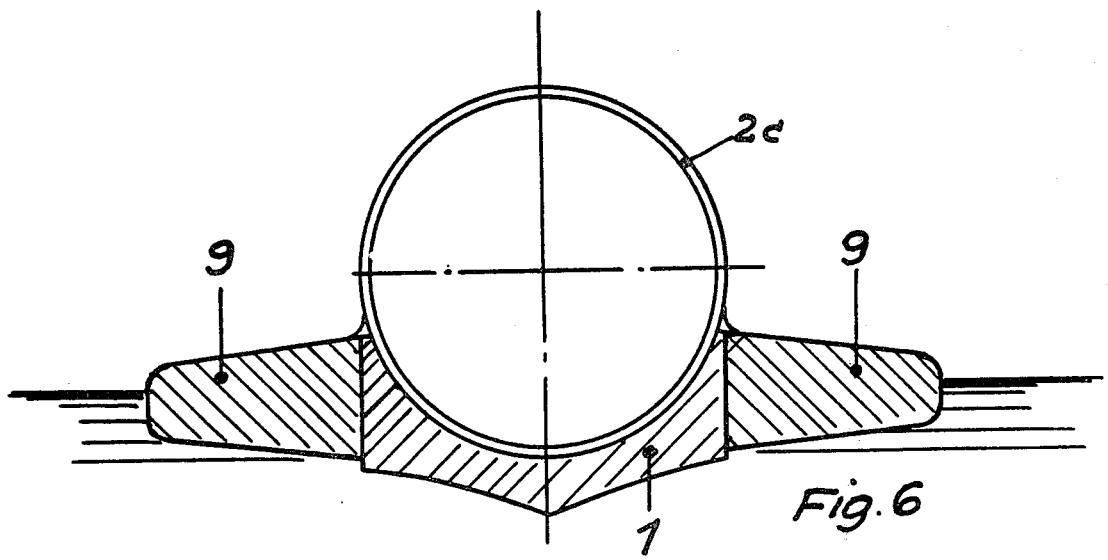

One embodiment of the present invention will now be further described hereinafter with reference to the accompanying drawings, wherein FIG. 1 illustrates a flying boat in a side view;
FIG. 2 illustrates a flying boat in a front view;
FIG. 3 is a cross-sectional view through the fuselage taken approximately in the center of the fuselage;
FIG. 4 is a modified view of FIG. 3;
FIG. 5 illustrates a flying boat with flotation beads, and
FIG. 6 illustrates the mounting of a complete pressure cabin on a boat body.

The basic concept of the present invention will now be schematically explained with reference to FIGS. 1 and 2. The airplane fuselage is subdivided in its longitudinal direction by a dash-dotted separating line A. Below this separating line is a boat body 1 in a conventional construction with stepping. This boat body 1 can be manufactured with sufficient strength as the carrying structural part for the entire airplane construction. Mounted thereon above the separating line A is the cabin part 2. It is additionally shown in FIG. 1 in this connection that the cabin part 2 may be subdivided, if required, into several parts 2, 2a, and 2b. In the embodiment or example here chosen the fuselage tall 5 with the tall assembly is constructed as a unit in monocoque or shell construction and is connected to the rear end of the boat body 1 and also to the cabin part 2.

The bottom of the boat body 1 also may be constructed as a double bottom which is required for assuring buoyancy in case of damage to the outer boat skin, in which case the inner bottom is laterally raised up to above the water line W (see FIGS. 3 and 4).

Laterally of the boat body 1, stabilizing stubs 4 may be attached, if required. They complement the boat body in known manner and improve the flotation stability. If desired, these stubs 4 are integrated in a rigid unit of the boat body 1.

The separating line A has been drawn in purely schematically and does not absolutely have to extend in a straight fashion, but it also may be offset vertically. Thus, for example, the entire fuselage nose may be included in the boat body 1, and the separating line A, beginning only at the cockpit superstructure, may extend initially vertically up to the height of A, and thereafter horizontally to behind the wing assembly, and then continue on with an interruption at a different height to the fuselage tail.

FIGS. 1 and 2, a high-wing type of construction has been used as an example for the wing assembly. The wing assembly 3 is therein supported against the stabilizing stubs 4 through the struts 7. A further support is possible directly at the boat body 1 for example through the struts 8. It is shown in FIG. 2 by means of a separating line at the wing assembly 3 outside of the struts 7 that the wing assembly 3 may be subdivided into a center wing piece 3a and outer wings mounted adjacent thereto. The arrangement of the engines 6 is here in the center wing piece 3a.

FIG. 3 shows a cross-section through the flying boat fuselage approximately at the height of the wing assembly. The boat body 1 is shown hatched. Attached thereto are the stabilizing stubs 4. Assumed here is a normal watertight construction of the boat body; i.e. the boat bottom above and below and the side walls are riveted in a watertight manner. The boat body 1a at the top thereof may be lowered, if desired, to below the water line. It is readily apparent that the boat body must be constructed with sufficient strength in order to be the carrying part of the entire airplane. The boat body also has enough space to allow for the installation therein, for example, of control elements, operating parts, fuel tanks, and the like. The installation of these parts or elements occasions no difficulties. Thus it is possible to install, for example, under the floor of the cabin an easily accessible shaft 1b. The bulkheads of the boat form are made simply in the conventional manner. Similarly, a multiple-subdivided bulkheading or compartmentalization of the boat body is made in the conventional manner. The schematic separating line A is again shown in dash-dotted lines in FIG. 3. Placed or mounted upon the boat body 1 is the cabin part 2 and it is rigidly connected with the boat body 1. Only the outer contour of the cabin part 2 is shown in the left-hand half of FIG. 3. No built-in parts or units are illustrated therein. The connection between the cabin part 2 and the boat body 1 may be effected in known manner. The type of connection is of secondary importance for the present invention. In the right-hand part of FIG. 3 it is indicated that, by means of a strutting system 8, the wing assembly 3 may be supported directly at the boat body 1 and connected therewith. The cabin part 2 may be completely made as a separate part during manufacture and, if desired, it also may be fully equipped. As has been set forth hereinbefore, it is possible to also make the cabin part as a complete pressure cabin. No bulkheading is required in the cabin part.

FIG. 4 illustrates a modified embodiment of the construction described in the foregoing. In FIGS. 1 to 3, a high-wing airplane was chosen as an embodiment. In contrast thereto, FIG. 4 illustrates a flying boat in semi-high-wing construction. In this case, a center wing piece 3a is integrated in the cabin part 2 and together therewith mounted upon the boat body 1. The outer wings 3 which adjoin the center wing part 3a are shown in phantom.

It is evident that the cabin part 2 once it is mounted and after its connection with the boat body 1, is utilized for reinforcement and for the transfer of force in the system "airplane" (for example for tail assembly loads, wing- and engine support).

FIGS. 5 and 6 illustrate a further embodiment of the present invention. Shown schematically therein is a construction in which there are provided at the boat body, in the place of the stabilizing stubs 4, the flotation beads 9 for the purpose of improving the flotation stability. The flotation beads 9 are watertight, as is the boat body 1, and may be detachably secured to the boat body 1. Aside from stability, they afford an advantageous protection against collision with foreign objects. The flotation beads are customarily subdivided in the length thereof into several cells adapted to being pumped out, and may, if desired, also accommodate fuel containers or the like.

The flying boat is intended to be suitable in this embodiment for high altitude flights. The cabin part is therefore constructed as a complete pressure cabin 2c and, as shown in FIG. 6, inserted as a whole into the tub-like boat body 1 and secured thereto. In this case, the boat body 1 need be only watertight, but not pressure-tight. As the pressure cabin 2c, for example, a complete pressure fuselage of a landplane may be used and rebuilt in this manner from a landplane into a flying boat. The lifting surfaces or wings 3 are shown in phantom in the embodiment of FIG. 5.

It will be obvious to those skilled in the art that many modifications may be made within the scope of the present invention without departing from the spirit thereof, and the invention includes all such modifications.

What is claimed is:

1. In a flying boat having a boat-like fuselage,
   the improvement comprising a substantially horizontal separation of the fuselage above the water line, extending in the longitudinal direction essentially from the nose to the tail, into two structural parts which may be separately manufactured,
   one of said parts being dish-shaped at the bottom and open and recessed at the top and being a complete boat body and the supporting part of the flying boat,
   the other of said parts being dish-shaped at the top and open at the bottom, including a cabin part, and forming a roof for said fuselage,
   and means securing said parts prefinished as units together to form a closed fuselage.

2. A flying boat according to claim 1 including a major part of aircraft control and operating elements in said boat body part.

3. A flying boat according to claim 1 which in said upper cabin part comprises several part shells.

4. A flying boat according to claim 1 including a fuselage tail with a tail assembly part adapted to be connected to said boat body part.

5. A flying boat according to claim 4 in which said fuselage tail is of monocoque construction.

6. A flying boat according to claim 1 including stabilizing stubs adapted to be connected on both sides of said boat body part.

7. A flying boat according to claim 6 including a wing assembly supported at the boat body part and said stabilizing stubs.

8. A flying boat according to claim 7 in which a center wing piece of said wing assembly is integrated into said cabin part.

9. A flying boat according to claim 1 including flotation beads adapted to be connected on both sides of said boat body part.

10. A flying boat according to claim 1 including a double bottom in said boat body part whereby a central area of an inner bottom is below the water line and on both sides inner bottom parts are raised above the water line.

* * * * *